June 5, 1951            J. ROSE            2,555,659

BABY BED CONSTRUCTION FOR AUTOMOBILES

Filed March 1, 1950            2 Sheets-Sheet 1

Joseph Rose
INVENTOR.

BY *Clarence A. O'Brien*
*and Harvey B. Jackson*
Attorneys

June 5, 1951  J. ROSE  2,555,659
BABY BED CONSTRUCTION FOR AUTOMOBILES
Filed March 1, 1950  2 Sheets-Sheet 2
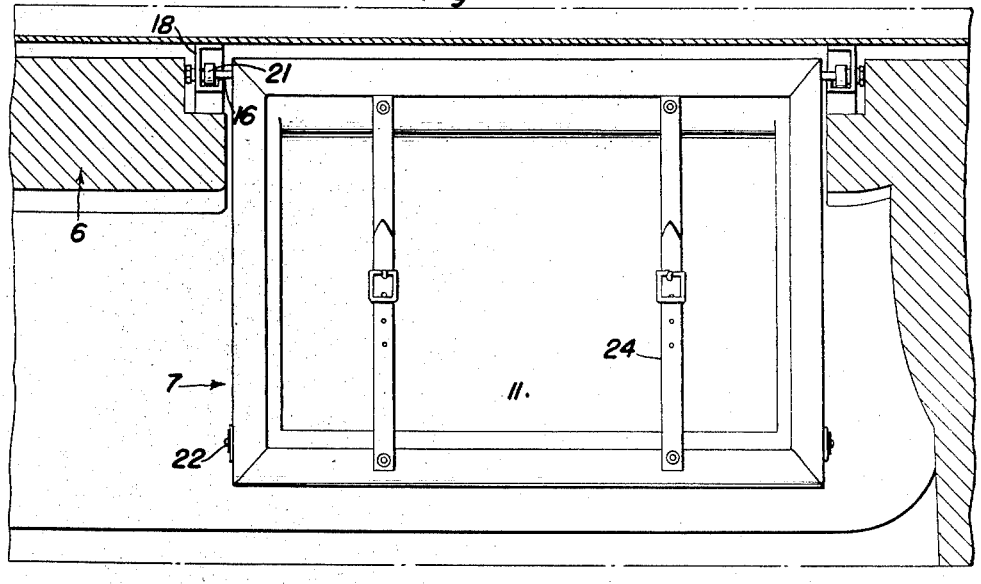
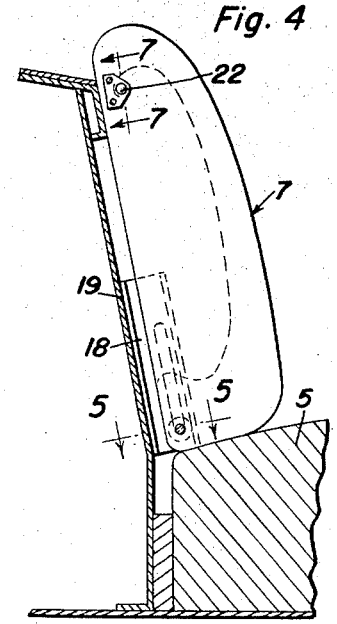
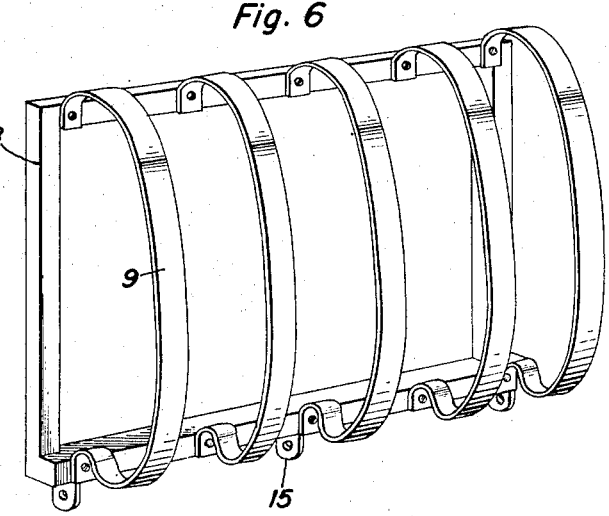
Joseph Rose
INVENTOR.

Patented June 5, 1951

2,555,659

UNITED STATES PATENT OFFICE 2,555,659

BABY BED CONSTRUCTION FOR AUTOMOBILES

Joseph Rose, Easton, Pa.

Application March 1, 1950, Serial No. 147,080

3 Claims. (Cl. 5—94)

The present invention relates to new and useful improvements in baby beds and more particularly to a bed construction for use with automobiles.

An important object of the invention is to provide a combined rear seat and bed construction in which the back of the rear seat is constructed to provide a baby's bed.

A further object of the invention is to construct the rear seat of an automobile with a folding back rest for swinging forwardly on top of the seat cushions and constructing the rear of the back rest to form a baby's bed for comfortably holding a baby when the back rest is lowered and in which the bed is concealed behind the back rest when the latter is raised in a position for use by the occupant of the vehicle.

A further object of the invention is to provide a device of this character of simple and practical construction, which is neat and attractive in appearance, relatively inexpensive to manufacture and install in position in the vehicle and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a top plan view with parts shown in section;

Figure 4 is a vertical sectional view showing the back rest in raised position;

Figure 5 is an enlarged sectional view taken on a line 5—5 of Figure 4 and showing one of the rollers and guides for the back rest;

Figure 6 is a perspective view of the frame forming the foldable baby bed and back rest.

Figure 1:
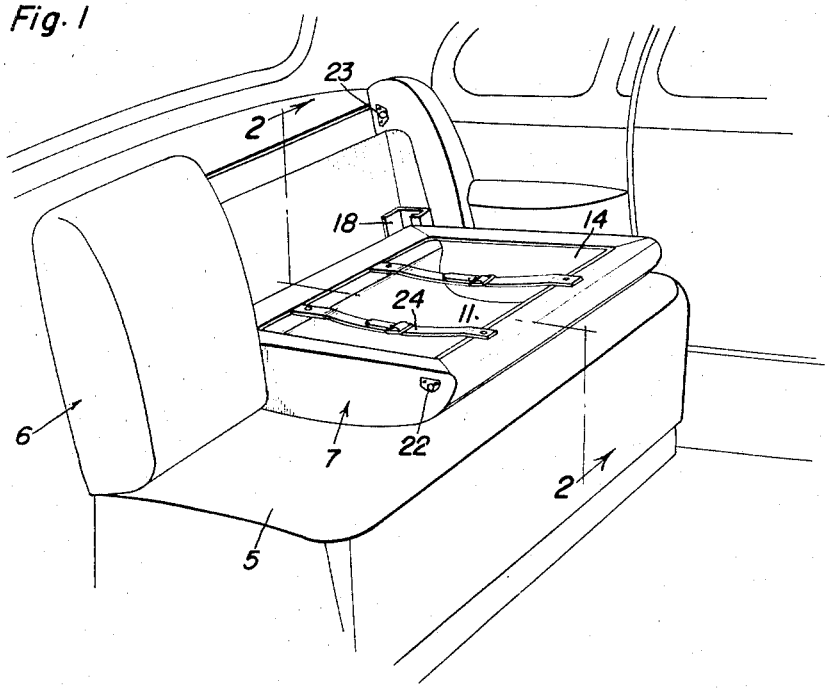
Figure 1 is a perspective view showing the baby bed in its open position.
Figure 2:
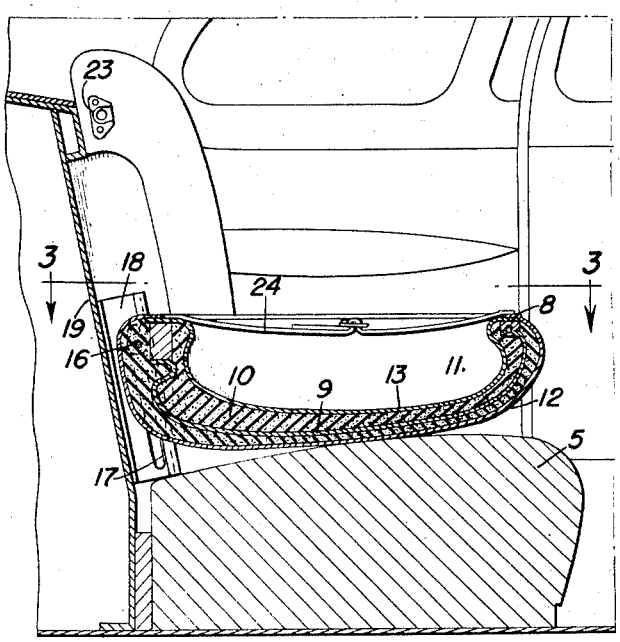
Figure 2 is a sectional view taken on a line 2—2 of Figure 1.
Figure 7:
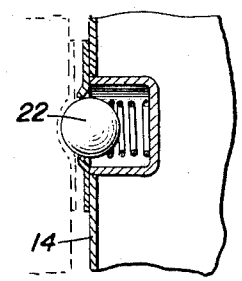
Figure 7 is an enlarged fragmentary sectional view of the catch for holding the back rest in its raised position.

Referring now to the drawings in detail wherein for the purpose of illustration I have disclosed a preferred embodiment of the invention, the numeral 5 designates the cushion of the rear seat of an automobile while the numeral 6 designates a stationary part of a back rest at one end of the seat cushion and 7 is a foldable back rest section.

The foldable section 7 is constructed of a substantially rectangular frame 8 to the upper and lower portions of which substantially arcuate springs 9 of strap metal are secured with the springs positioned vertically when the back rest is in its raised position and with the springs bowed in a forward direction.

The springs 9 are embedded in a padding 10 of foam rubber or other suitable material which is formed with a recess 11 at the rear surface of the back rest, the padding being enclosed in a covering material 12 which also extends into the recess 11 to form a lining 13 therefor. The ends of the back rest section 7 are closed with end walls 14 which are also covered by the covering material or upholstery 12.

The lower edge of frame 8 is provided with a plurality of apertured ears 15 in which a shaft or rod 16 is positioned to project outwardly from the end walls 14 at their lower portions. The outer ends of rods 16 project through vertical slots 17 in channeled guides 18 suitably secured to the stationary back structure 19 at each end of folding back rest section 7. Rollers 20 are journaled on rod 16 to travel in the vertical slots 17 and rollers 21 are also journaled on the rod 16 to travel in the channel guides 18.

The back rest section 7 is held in its raised position by spring projected ball catches 22 positioned in the end walls 14 adjacent the upper edge of the back rest section and engaged in sockets or keepers 23 secured to a part of the stationary back rest structure 19.

In the operation of the device the foldable back rest section 7 is held in its raised position by the catches 22 with the lower edge of the foldable section 7 resting on the rear of seat cushion 5, as shown in Figure 4 of the drawings and with the front surface of the folding section 7 flush with the front surface of the stationary back rest section 6 to provide a continuous back rest for the rear seat of the automobile.

When it is desired to use the recess 11 at the back of back rest section 7 as a baby's bed the back rest section 7 is swung downwardly on rod 16 as its fulcrum so that the back rest section 7 then lies on top of seat cushion 5, as shown in Figure 1. Rollers 20 and 21 travel upwardly in guide 18 so that the back rest section 7 will lie in a substantially horizontal position on the seat cushion. Straps 24 are attached to frame 8 to hold the baby safely in bed.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In an automobile seat construction, a back comprising a frame, forwardly bowed leaf springs secured in a vertical position to the frame, padding enclosing the springs to cover the front and rear surfaces thereof, said padding being recessed at the rear of the back to form a bed for a baby, and means connecting the lower edge of the frame to the seat structure to permit vertical swinging and also for vertical sliding movement into and out of a horizontal position on top of a seat cushion.

2. In an automobile seat construction, a back comprising a frame, forwardly bowed leaf springs secured in a vertical position to the frame, padding enclosing the springs to cover the front and rear surfaces thereof, said padding being recessed at the rear of the back to form a bed for a baby, vertical guides fixed to the seat structure at the ends of the back and rollers journaled at the ends of the back and traveling in the guides and connecting the back to the seat structure for vertical swinging and also for vertical sliding movement into and out of a horizontal position on top of a seat cushion.

3. In an automobile seat construction, a back comprising a frame, forwardly bowed leaf springs secured in a vertical position to the frame, padding enclosing the springs to cover the front and rear surfaces thereof, said padding being recessed at the rear of the back to form a bed for a baby, straps attached to the frame for holding a baby in the bed, and means connecting the lower edge of the frame to the seat structure for vertical swinging and also for vertical sliding movement into and out of a horizontal position on top of a seat cushion.

JOSEPH ROSE.

REFERENCES CITED

The following references are of record in the file of this patent:

UNITED STATES PATENTS

| Number | Name | Date |
|---|---|---|
| 591,095 | Evans | Oct. 5, 1897 |
| 2,240,748 | Bak | May 6, 1941 |
| 2,261,996 | Haberstump | Nov. 11, 1941 |
| 2,436,294 | Glatstein | Feb. 17, 1948 |